Nov. 6, 1962
D. M. MacMILLIN
3,062,111
INTERMITTENT NEEDLE ENTRAPMENT IN AN AUTOMATIC EXPOSURE CONTROL
Filed Feb. 24, 1959
3 Sheets-Sheet 2
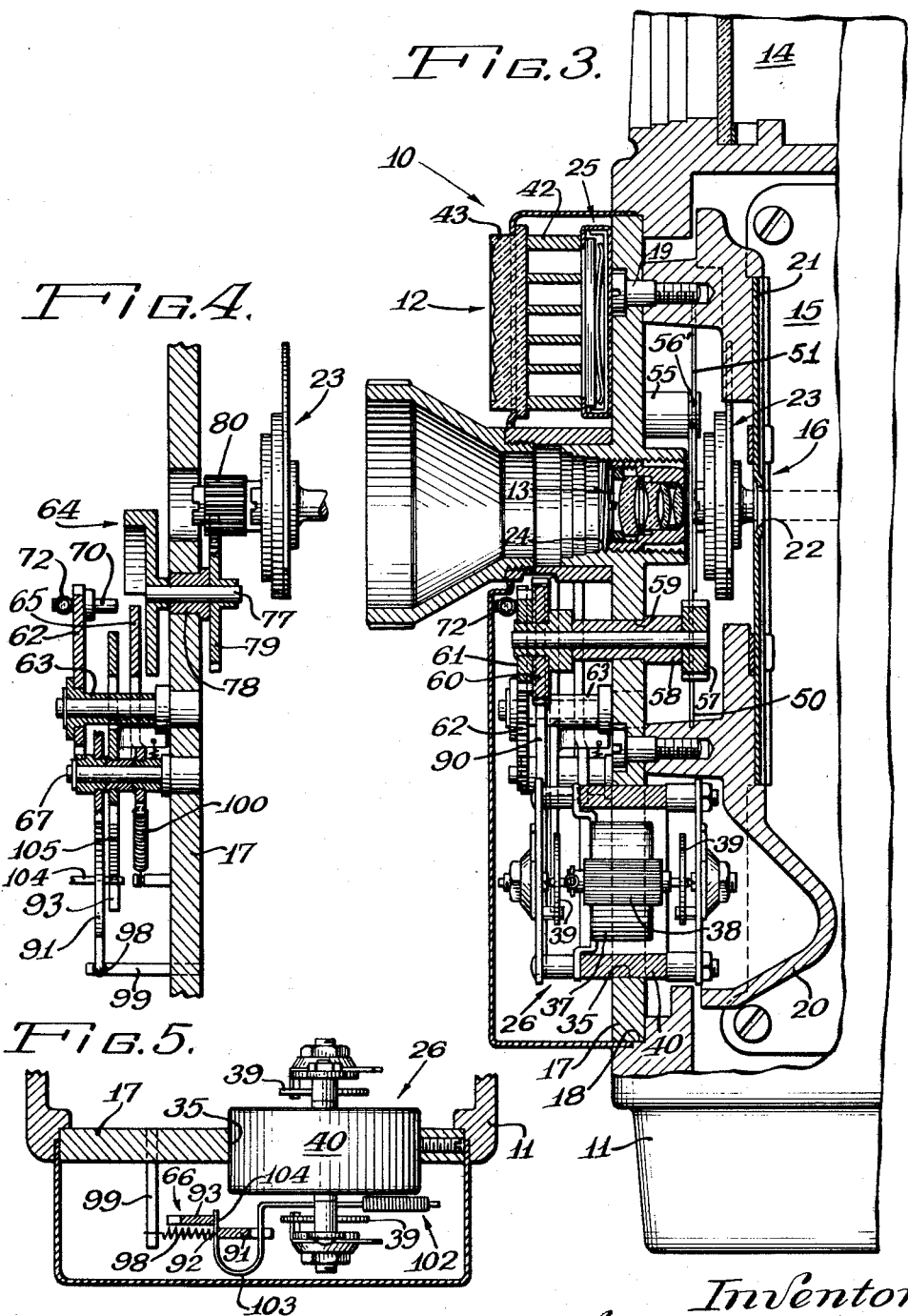
Inventor:
David M. MacMillin

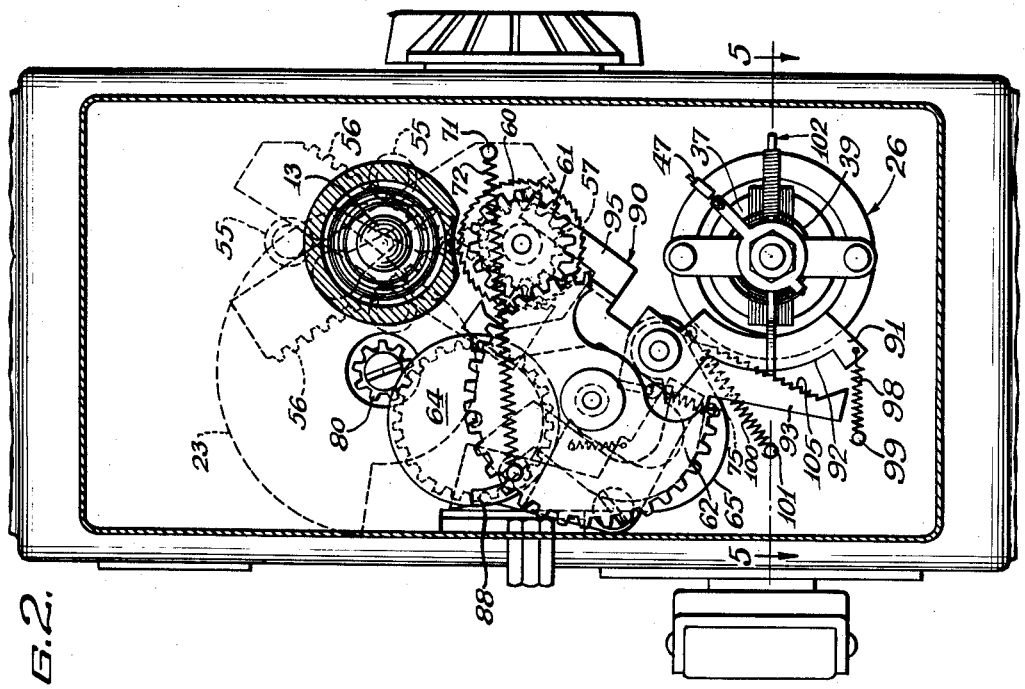

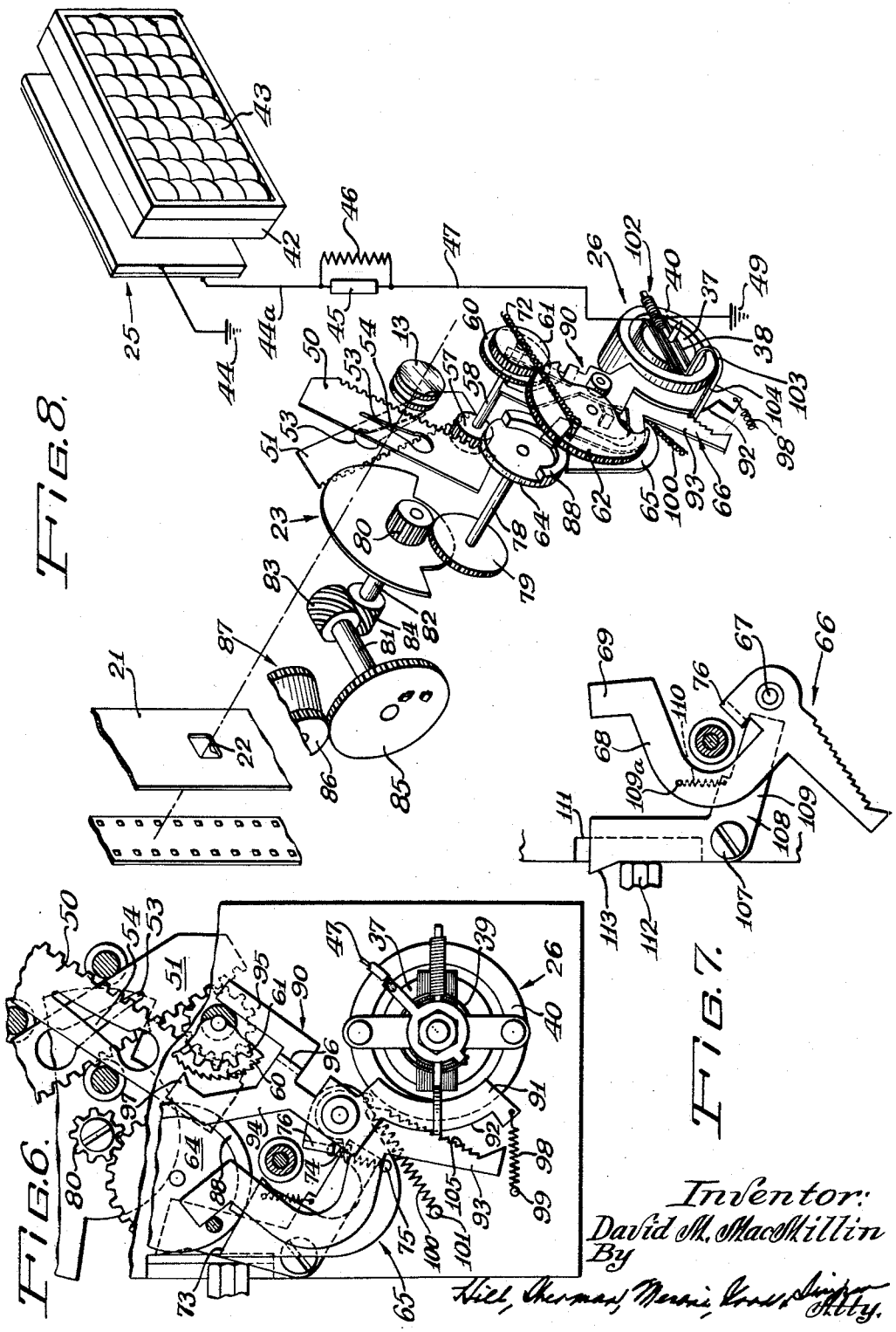

United States Patent Office 3,062,111
Patented Nov. 6, 1962

3,062,111
INTERMITTENT NEEDLE ENTRAPMENT IN AN
AUTOMATIC EXPOSURE CONTROL
David M. MacMillin, Wilmette, Ill., assignor to Bell &
Howell Company, Chicago, Ill., a corporation of Illinois
Filed Feb. 24, 1959, Ser. No. 794,966
7 Claims. (Cl. 95—10)

This invention relates to photographic cameras and more particularly relates to a means for automatically controlling the exposure of film within such a camera in response to the light available.

Applicant's diaphragm opening control mechanism comprises generally a pair of apertured, elongated iris members which are disposed in overlapping relationship with respect to one another and which are movable longitudinally to vary the area of the diaphragm opening defined thereby by a drive gear which is cooperable therewith. The drive gear is, in turn, rotatably driven in opposite directions by means of an oscillatable gear which is cooperable therewith and which is oscillated in one direction by a motion translation lever and which is oscillated in an opposite direction by a main spring. The motion translation lever which acts to oscillate the oscillatable gear in one direction and which acts as a stop for limiting spring urged movement of the oscillatable gear in an opposite direction is pivotally moved about its respective axis by resilient drive means and is periodically urged for pivotal movement as long as the camera is running. A galvanometer, which is electrically connected to a photoelectric cell, has a rotary meter coil associated therewith which is rotatable as a function of the electrical energy derived from the photoelectric cell. An entrapment needle is affixed to the rotary meter coil for corotatable movement therewith and is disposed in the path of pivotal movement therewith and is disposed in the path of the motion translation member to act as a positionably variable stop for limiting pivotal movement of the motion translation member as a function of the intensity of light impinging on the photoelectric cell. As hereinbefore noted, the motion translation member in turn acts to position the oscillatable gear member which in turn acts to rotate the drive gear cooperable with the iris members so that the area of the diaphragm opening defined by the cooperating iris members is thereby varied as a function of the intensity of light impinging on the photoelectric cell.

A means is also provided, which will hereinafter be described, for moving the motion translation lever out of engagement with the entrapment needle to thereby free the entrapment needle and consequently the rotary meter coil associated with the galvanometer whenever the camera is not running so that when the camera operation is initiated the entrapment needle will be free to seek its proper position corresponding to the intensity of light impinging on the photoelectric cell.

It will also hereinafter become more fully apparent as the following specification proceeds that a ratcheting mechanism is associated with the iris blade drive mechanism so that unnecessary and undesirable movement of the iris members will not be effected each time the motion translation member pivotally moves about its respective axis to thereby accurately maintain a given diaphragm opening area as a function of the intensity of light impinging on the photoelectric cell.

Accordingly, it is a principal object of the present invention to provide an improved means for adjusting the diaphragm opening in a photographic camera.

Another object of the present invention is to provide an improved means for automatically adjusting the area of the diaphragm opening in a photographic camera as a function of the intensity of light impinging on a photoelectric cell which is substantially insensitive to movements of the camera itself but which need not be inertially balanced.

These and other objects, features, and advantages of the present invention will become apparent from time to time as the following specification proceeds and with reference to the accompanying drawings, wherein:

FIGURE 1 is a front elevational view of the diaphragm opening control mechanism constructed in accordance with the principles of the present invention which shows the front face of the camera removed;

FIGURE 2 is a front elevational view which is similar in nature to the view illustrated in FIGURE 1 but which shows the cooperating iris members and various control elements associated therewith in a different operating position;

FIGURE 3 is a fragmental vertical sectional view through the camera illustrated in the drawings which is taken along line 3—3 of FIGURE 1;

FIGURE 4 is a fragmental vertical sectional view of the camera illustrated in the drawings which is taken along lines 4—4 of FIGURE 1 and which, for the sake of clarity, shows several of the cooperating control elements removed;

FIGURE 5 is a fragmental horizontal sectional view taken along lines 5—5 of FIGURE 2;

FIGURE 6 is a fragmental front elevational view of the camera illustrated in the drawings which is similar in nature to FIGURES 1 and 2 but which, for the sake of clarity, shows several of the parts removed;

FIGURE 7 is a front elevational view of the motion translation or entrapment lever and one of its associated components which acts to free the lever when operation of the camera is initiated; and FIGURE 8 is an exploded pictorial view of the exposure control mechanism of the present invention together with parts of the camera related thereto and including the circuit diagram of the control.

Referring now particularly to FIGURE 3 there is shown a motion picture camera 10, which per se is of standard design and which includes generally a casing 11 having a photoelectric eye 12, a lens 13 and a view finder 14 associated therewith. The casing 11 serves to enclose the mechanism of the camera and provides a film chamber 15 therein within which are arranged two spaced rotatable film spools (not shown) and a vertical exposure guide 16 arranged at the front portion of the film chamber 15.

The front wall 17 of the camera casing 11 comprises a separate part detachably secured in a shouldered opening 18 in the front of the main casing 11 by headed screws 19 screw-threaded rearwardly into a frame part 20 fixed within the main casing portion 11.

The exposure guide 16 comprises a front guide plate 21 which is secured within the casing on the frame part 20 in rearwardly spaced relation from the front wall 17. Film is guided against the rear face of the guide plate 21 and the guide plate is provided with a forwardly facing horizontally elongated rectangular exposure aperture 22, conforming with a standard motion picture frame through which successive frames of the film are exposed as the film is intermittently fed through the exposure guide. It will further be noted that a rotary shutter 23 is positioned immediately in front of the guide plate and is rotated in timed relation with the intermittent feed of the film to cover the exposure aperture 22 during the film feed intervals as is usual.

The front wall 17 is also provided with a lens opening 24, with which the exposure aperture 22 is aligned, and a suitable photographic lens 13 is mounted on the front wall within the lens opening 24, and in alignment with the exposure aperture 22, for forming images on the film at the exposure aperture.

As shown in the diagrammatic representation of the diaphragm opening control mechanism of the present invention illustrated in FIGURE 1, a photoelectric cell 25 is electrically connected with a galvanometer 26 which is, in turn, associated with the mechanical linkage of the diaphragm opening control mechanism, forming the subject of the present invention, for controlling the operation of same.

The galvanometer 26 is suitably positioned within an aperture 35 in the front wall 17 in a manner which is well known in the art and is of usual construction, comprising a central cylindrical permanent magnet 37, a pivoted rectangular circuit coil 38 surrounding the magnet 37 and spring biased to a zero position by spiral springs 39, and a ring 40 of magnetic material surrounding the coil and serving to concentrate the magnetic field of the magnet. The galvanometer is so positioned that the pivotal axis of the coil is normal to the plane of the exposure aperture 22.

The forwardly facing photoelectric cell 25 is mounted at the front of the camera above the lens 13 and has the usual light controlling baffle 42 disposed in front of the cell and the usual reticular lens 43 secured in front of the baffle by suitable securing means. The circuit coil of the galvanometer is connected in circuit with the photoelectric cell 25 so that the coil is deflected from its spring biased zero position by current derived from the photoelectric cell in proportion to the intensity of light impinging on the photoelectric cell. The photoelectric cell is connected, as designated at 44, to the metal framework of the camera, which framework is for convenience referred to as "ground," and the other terminal of the cell is connected by a conductor 44a to one terminal of a resistor 45 and with a resistor 46, which is connected in shunt with the resistor 45. The other terminals of these resistors are connected by a conductor 47 to one terminal of the circuit coil 38 of the galvanometer 26, and the other terminal of this coil is connected to ground as designated at 49.

The purpose of the resistors 45 and 46 is to compensate for the positive temperature coefficient of resistance of the photoelectric cell and the galvanometer circuit per se, so that the deflection of the circuit coil 38 is approximately uniform throughout the range of temperature normally encountered in use, as from zero to 100° F. For this purpose, the resistor 45 commercially known as a thermistor, has a negative temperature coefficient of resistance greater than the positive temperature coefficient of resistance of the photoelectric cell and galvanometer circuit per se, and the resistor 46 serving as a modifying resistor, has a temperature coefficient of resistance lying between the positive temperature coefficient of resistance of the photoelectric cell and galvanometer circuit per se and the negative temperature coefficient of resistance of the thermistor 45, the characteristics of these resistances being specifically selected to obtain the aforesaid compensation.

A pair of elongated iris members 50 and 51 are disposed in overlapping relationship with one another and have tear drop or tapered diaphragm openings 53 formed therein which are cooperable to define a diaphragm opening 54. Three guide pins 55 are triangularly secured to the rear face of the front wall 17 and are grooved as at 56' to slidably receive and guide the iris members 50 and 51 for axial movement.

Each of the iris members has a plurality of gear teeth 56 formed along the inner longitudinal edge thereof which are cooperable with and disposed in driving engagement with a plurality of peripheral gear teeth on a drive gear 57. The drive gear 57 is, in turn, mounted on one end of a shaft 58 which is journaled in a suitable receiving aperture 59 formed in the front wall 17 and which has a radially enlarged ratchet gear 60 and a radially reduced spur gear 61 mounted on the forward free end thereof.

The spur gear 61 drivingly engages an oscillatable spur gear 62 which, in turn, is mounted for oscillatory movement about an elongated shaft 63 which is attached to and extends forwardly of the front wall 17 and is arranged to be rotatably driven thereby.

Oscillatory movement of the spur gear 62 is effected by means of a resilient drive mechanism which comprises generally a cam wheel 64, a fan tail drive link 65, and a motion translation member or entrapment lever 66 in the following manner: The entrapment lever 66 is mounted for pivotal movement on a pin 67 which is mounted on and which extends forwardly of the front wall 17 in a positon below the pin 63. The lever 66 has an arcuate leg 68 formed integrally therewith which has an outturned finger 69 extending from the outer free end thereof. As shown most clearly in FIGURE 4, the spur gear 62 has a pin 70 extending through the peripheral edge thereof which extends both forwardly and rearwardly of the spur gear 62 and which serves as an abutment member for the entrapment lever 66 for reasons which will hereinafter become apparent.

A pin 71 is affixed to the front wall 17 and serves as a binding post for one end of a spring member 72 which is connected, at its opposite end portion, to that portion of the pin 70 which extends forwardly of the spur gear 62 to urge the gear 62 in a clockwise direction as shown in the drawings. It will thus be apparent that counterclockwise pivotal movement of the entrapment lever 66 is operable, by abutment of the finger 69 with the portion of the pin 70 extending rearwardly of the spur gear 62, to effect counterclockwise rotatable movement of the spur gear 62 about the pin 63 against the opposing biasing force of the tension spring 72.

Counterclockwise rotatable movement of the spur gear 62 about the pin 63 will act to rotate the spur gear 61, shaft 58, and gear 57 in a clockwise direction to thereby effect axial movement of the iris members 50 and 51 from the position illustrated in FIGURE 1 toward the position illustrated in FIGURE 2 to accordingly increase the area of the diaphragm opening 54 defined by the tapered or tear drop apertures 53 in the cooperating iris members. Conversely, clockwise spring urged movement of the spur gear 62 will act to move the spur gear 61, shaft 58, and gear 57 in a counterclockwise direction to axially move the iris members 50 and 51 within the slotted guide pins 55 in an opposite direction to decrease the area of the diaphragm opening defined by the cooperating iris members.

The fan tail drive link 65 is similarly mounted for pivotal movement about the pin 67 intermediate the entrapment lever 66 and the front wall 17 and is substantially U-shaped in front elevation having a relatively wide cam face 73 formed on the outer free end thereof. A tension spring 74 interconnects a binding post 75 which is connected to and extends forwardly of the fan tail drive link 65 and an outturned flange 76 formed integrally with the entrapment lever 66 to resiliently connect the fan tail drive link 65 with the lever 66.

As shown most clearly in FIGURE 4 the cam wheel 64 is mounted on a shaft 77 for corotatable movement therewith which shaft is, in turn, journaled for rotatable movement in a low friction bearing 78 seated in an aperture in the front wall 17 of the camera 10 above the pin 63. A gear 79 having a plurality of gear teeth formed about the peripheral edge thereof is also mounted on the shaft 77 but rearwardly of the front wall 17 and is arranged to drivingly engage a gear 80 which is, in turn, connected with the rotary shutter 23 for corotatable movement therewith. The rotary shutter 23 is rotatably driven in a counterclockwise direction by means of a spring wound power source (not shown) through a pair of drive shafts 81, 82 having coacting gears 83 and 84, respectively, mounted thereon. A large diameter spur gear 85 is mounted on the shaft 81 to transmit rotary driving force thereto from the spring wound power source and drivingly engages a smaller diameter gear 86 of a governor 87 so that rotation of the shaft 81 will be effected with a constant velocity while the camera is running in a manner which is well known in the art.

A substantially semi-circular outturned lip 88 is formed about the periphery of the cam wheel 64 and acts as a cam to transmit driving force from the shaft 78 through the resilient drive linkage to the oscillatable spur gear 62.

The fan tail drive link 65 is urged by a tension spring 100, which resiliently interconnects the drive link with a binding post 101, into engagement with the semi-circular cam 88 during that period when the semi-circular cam 88 is disposed in the path of movement of the broad cam face 73 of the fan tail 65 and is otherwise urged by the same means to an extreme clockwise rotated position as is illustrated in FIGURE 1.

As shown most clearly in FIGURES 6 and 8, a pivoted member 90 is mounted for pivotal movement on the shaft 67 forwardly of the entrapment lever 66 and that member has an arcuate leg 91 disposed below the pin 67 which has a convex face 92 disposed toward the lower depending leg 93 of the entrapment lever 66. The opposite end portion of the member 90 has a pair of arms 94 and 95 formed integrally therewith and extending therefrom which are positioned on opposite sides of the shaft 58. The arm 95 is stepped as at 96 so that the arm may be moved into engagement with the shaft 58 without interfering with the gears 60 or 61. The arm 94, on the other hand, has a ratchet ear 97 formed integrally therewith which is cooperable with the ratchet teeth formed about the periphery of the ratchet gear to prevent counterclockwise rotatable movement of the gear 60 and consequently, the gear 61, shaft 58, and gear 57. The arm 95 is so spaced from the ratchet ear 97 that the member 90 is permitted only limited freedom of pivotal movement about the pin 67 so that the limits of pivotal movement of the member 90 are to that position illustrated in FIGURE 6 and thence to the position wherein the ear 97 engages the peripheral ratchet teeth on the ratchet gear 60.

As again shown most clearly in FIGURE 6, the member 90 is normally biased in a clockwise direction by means of a tension spring 98 which is connected, at one end thereof, to the lower end portion of the member 90 and, at the other end thereof, to a binding post 99 which is affixed to the front wall 17 and which, as shown in FIGURE 4, extends forwardly thereof.

An entrapment needle 102 is affixed to the rotary circuit coil 38 of the galvanometer 26 for co-rotatable movement therewith and has an arcuate portion 103 formed intermediate the main body thereof and a depending leg 104 thereof. The leg 104 extends adjacent the convex face of the pivoted member 90 and remains in a position adjacent the convex edge regardless of the rotated position of the entrapment needle 102. The depending leg 93 of the entrapment lever 66 has a stepped cam face 105 formed therealong which is cooperable with the depending leg 104 of the entrapment needle 102 to pinch the leg intermediate the entrapment lever 66 and the arcuate convex face 92 of the pivotal member 90 to prevent movement of the needle 102.

It is important to note that when the entrapment needle 102 is in the position illustrated in FIGURE 2 counterclockwise pivotal movement of the entrapment lever 66 is limited by engagement of the stepped cam face 105 thereof with the depending leg 104 of the entrapment needle 102 and that the position of the finger 69 at the upper end of the entrapment lever 66 is effective to limit spring urged clockwise rotatable movement of the spur gear 62 so that the spur gear 62, and consequently the gear 61, shaft 58, and gear 57 are permitted to move in a counterclockwise direction only to the point illustrated in FIGURE 2. Thus, when the entrapment needle 102 is in the position illustrated in FIGURE 2 the maximum area for the diaphragm opening 54 defined by the co-operating tapered apertures 53 in the iris blades 50 and 51 is that which is illustrated in FIGURE 2. Obviously, if the entrapment needle 102 were positioned in a counterclockwise rotated position from that illustrated in FIGURE 2, the entrapment lever 66 would be movable to a more extreme counterclockwise rotated position than that illustrated in FIGURE 2 and the spur gear 62 would consequently be maintained in a more extreme counterclockwise rotated position than is illustrated in FIGURE 2 against the opposing biasing force of the tension spring 72 so that the area of the diaphragm opening 54 defined by the cooperating iris blades 50 and 51 would be larger than that illustrated in FIGURE 2.

A pivotal lever 108 is pivotally mounted about a pin 107 affixed to the front wall 17 and has an outwardly and downwardly extending leg 109 formed integrally therewith which is engageable with the outturned flange 76 of the entrapment lever 66. A tension spring 110 is connected at one end to the arm 109 of the lever 108 and, at the other end thereof, to a binding post 109a which is also connected with and extends forwardly of the front wall 17 to bias the lever 108 in a counterclockwise direction about the pin 107. It is important to note that when the fan tail drive link 65 is in an extreme clockwise rotated position such as is shown in FIGURE 1, the tension spring 110 acts to bias the pivotal lever 108 in a counterclockwise direction and thereby bias the entrapment lever 66 to an extreme clockwise rotated position such as is illustrated in FIGURE 1. The pivot pin 107 for the lever 108 is disposed directly below a slotted portion 11 in the camera casing 11 so that when a throttle button 112 is depressed into the slot 111 and downwardly therein to initiate operation of the camera, the lever 108 will be pivotally moved in a clockwise direction about the pin 107. The throttle button 112 is, of course, of a type which is generally used in the art wherein the button must be depressed and pushed downwardly to initiate normal operation of the camera but wherein the button is pushed inwardly and upwardly if it is desired to expose only a single frame of the film disposed within the camera. A sloping cam face 113 is formed on the outer edge of the lever 108 so that inward and upward movement of the throttle button 112 will act to similarly rotatably move the pivotal member 108 in a clockwise direction about the pin 107 in substantially the same degree as when the throttle button 112 is moved inwardly and downwardly. Obviously, clockwise pivotal movement of the member 108 acts to free the entrapment lever 66 for counterclockwise rotatable movement about the pin 67 by releasing the biasing force of the spring member 110 therefrom. Such freeing of the entrapment lever 66 is desirable for reasons which will hereinafter become apparent.

In view of the foregoing the operation of the exposure control mechanism is substantially as follows: Upon inward and upward depression of the throttle button 112 the lever 108 is moved in a clockwise direction about the pin 107 thereby moving the arm 109 out of engagement with the flange 76 formed integrally with the entrapment lever 66 to free the lever for pivotal movement about the pin 67. The circuit coil 38 and the entrapment needle 102 connected thereto are rotatably moved to a predetermined position as a function of the intensity of light impinging on the photoelectric cell 25 which, for illustrative purposes, is that position illustrated in FIGURES 1, 2 and 6. Referring now particularly to FIGURES 1 and 2, clockwise rotatable movement of the cam wheel 64 from the position illustrated in FIGURE 1 toward the position illustrated in FIGURE 2 will act to urge the fan tail link arm 65 to move pivotally in a counterclockwise direction about the pin 67 against the opposing biasing force of the tension spring 100. Counterclockwise rotatable movement of the fan tail link arm 65 will act through the spring member 74 to resiliently urge the entrapment lever 66 to pivotally move in a counterclockwise direction about the pin 67. Such counterclockwise pivotal movement of the lever 66 will act through engagement with the finger 69 and the pin 70 to urge the oscillatable spur gear 62 to move in a counterclockwise direction about the pin 63 since the spring member 72 is substantially a weaker spring than the spring member 74. Due to the engagement between the spur gear 61 and the spur gear 62 counterclockwise rotatable movement of the gear 62 will act to rotatably drive the spur gear 61 in a clockwise direction. Such clockwise rotatable movement of the gear 61 will act to rotatably move the ratchet gear 60, shaft 58, and gear 57 in the same direction to move the cooperating iris members 50 and 51 from the position illustrated in FIGURE 1 toward the position illustrated in FIGURE 2. The proportions and configuration of the various cooperating elements of the automatic exposure control mechanism are so arranged that the area of the diaphragm opening 54 will in this manner be rendered responsive to variations in the intensity of light impinging on the photoelectric cell 25.

Assuming now that the intensity of light impinging on the photoelectric cell 25 increases, the circuit coil 38 and the entrapment needle 102 will be urged to move in a clockwise direction from the position illustrated in FIGURES 1 and 2 when the entrapment lever 66 moves out of engagement with the depending leg 104 of the needle 102. When the cam 88 of the cam wheel 64 has moved out of engagement with the broad face 73 of the fan tail drive link 65 the drive link 65 will be moved to the extreme clockwise rotated position illustrated in FIGURE 1 by the biasing force of spring member 100 but the lever 66 will not be pressing against the depending leg 104 of the needle 102 so that the ratchet ear 97 formed on the arm 94 of pivotal member 90 will remain in engagement with the peripheral ratchet teeth on the ratchet gear 60 thereby preventing counterclockwise rotatable movement of the ratchet gear 60, gear 61, shaft 58, and gear 57 and consequently preventing clockwise rotatable movement of the oscillatable spur gear 62. When, however, the semicircular cam 88 formed on the cam wheel 64 again moves into engagement with the broad face 73 of the fan tail drive link 65 the drive link will be urged for counterclockwise rotatable movement about the pin 67 so that the lever 66 will also be moved in a counterclockwise direction in the manner hereinbefore described until the stepped cam face 105 of the entrapment lever 106 has moved into abutment with the depending leg 104 of the entrapment needle 102. When the stepped cam face 105 of lever 66 does move into engagement with the entrapment needle 102 to pinch the needle between the stepped cam face and the concave edge 92 of member 90, slight pivotal movement of the member 90 will be effected in a counterclockwise direction to move the arm 95 thereof into engagement with the shaft 58 and to consequently move the ratchet ear 97 out of engagement with the peripheral ratchet teeth on the ratchet gear 60. As soon as the ear 97 is moved out of engagement with the ratchet teeth on gear 60, the spring member 72 will act to rotatably move the oscillatable spur gear 62 in a clockwise direction until the pin 70 has moved into abutment with the outturned finger 69 formed integrally with the entrapment lever 66 thus rotatably moving the gear 61, shaft 58, and gear 57 in a counterclockwise direction to move the cooperating iris members 50 and 51 from the position illustrated in FIGURE 2 toward the position illustrated in FIGURE 1.

It is important to note that the cam wheel 64 is so formed and synchronized with respect to the rotary shutter 23 that the gear wheel 64 is only disposed in the position illustrated in FIGURE 2 during those intervals when the rotary shutter 23 is closing the exposure aperture 22 of the camera. Thus, variation of the area of the diaphragm opening 54 defined by the cooperating iris members 50 and 51 is effected only during those intervals when the exposure aperture is closed. The synchronization between the gear 80 and the shaft 78 may, however, be such that the exposure control mechanism is operative only during every second rotational cycle of the rotary shutter 23. Such synchronization is illustrated in the drawings wherein the circumference of the gear 79 is twice that of the gear 80.

It will herein be understood that this embodiment of the invention has been used for illustrative purposes only and that various modifications and variations of the present invention may be effected without departing from the spirit and scope of the novel concepts thereof.

I claim as my invention:

1. In a photographic camera having a film exposing aperture and a diaphragm for controlling the amount of light reaching said aperture, the improvement of means for automatically adjusting the diaphragm in response to the light available about said camera comprising a photoelectric cell, a galvanometer electrically connected to said photoelectric cell having a pivoted coil movable in response to variations in the electrical output of said cell, at least one iris member operable to define a diaphragm opening, gear means cooperable with said iris member to move said iris member to vary the area of said diaphragm opening, an oscillatable gear cooperable with said first mentioned gear means to rotatably move same, spring means biasing said oscillatable gear in one rotational direction, power means, resilient drive means drivingly interconnecting said power means with said oscillatable gear to urge said gear in an opposite rotational direction, means cooperable with said coil to limit rotational movement of said oscillatable gear as a function of the intensity of light impinging on said photoelectric cell, and means intermittently operable and cooperable with said oscillatable gear to prevent spring urged rotational movement of said oscillatable gear.

2. In a photographic camera having a film exposing aperture and a diaphragm for controlling the amount of light reaching said aperture, a rotary shutter effective to periodically cover and uncover said exposing aperture, the improvement of means for automatically adjusting the diaphragm in response to the light available about said camera comprising a photoelectric cell, a galvanometer electrically connected to said photoelectric cell having a pivoted coil movable in response to variations in the electrical output of said cell, at least one iris member operable to define a diaphragm opening, gear means cooperable with said iris member to move said iris member to vary the area of said diaphragm opening, oscillatable gear means cooperable with said first mentioned gear means to operably move same, spring means biasing said oscillatable gear means in one rotational direction, power means, resilient drive means drivingly interconnecting said power means with said oscillatable gear means to urge same in an opposite rotational direction, means cooperable with said coil to limit rotational movement of said oscillatable gear means as a function of the intensity of light impinging on said photoelectric cell, and means coupled with said resilient drive means and cooperable with said first mentioned gear means and synchronized with said rotary shutter operable to prevent spring urged movement of said oscillatable gear means whenever said rotary shutter has uncovered said film exposing aperture.

3. In a photographic camera having a film exposing aperture and a diaphragm for controlling the amount of light reaching said aperture, the improvement of means for automatically adjusting the diaphragm in response to the light available about said camera comprising a photoelectric cell, a galvanometer electrically connected to said photoelectric cell having a pivoted coil movable in response to variations in the electrical output of said cell, at least one iris member cooperable to define a diaphragm opening, gear means cooperable with said iris member to move said iris member to vary the area of said diaphragm opening, an oscillatable gear cooperable with said first mentioned gear means to rotatably move same, means biasing said oscillatable gear in one rotational direction, power means, resilient drive means drivingly interconnecting said power means with said oscillatable gear to urge said gear in an opposite rotational direction, means comprising an extension from said coil cooperable with said resilient drive means to limit rotational movement of said oscillatable gear in one direction as a function of the rotated position of said pivoted coil, and means actuatable by said last mentioned means and cooperable with said first mentioned gear means to intermittently prevent rotational movement of said oscillatable gear in an opposite rotational direction.

4. In a photographic camera having a film exposing aperture and a diaphragm for controlling the amount of light reaching said aperture, the improvement of means for automatically adjusting the diaphragm in response to the light available about said camera comprising a photoelectric cell, a galvanometer electrically connected to said photoelectric cell having a pivoted coil movable in response to variations in the electrical output of said cell, at least one iris member operable to define a diaphragm opening, an oscillatable gear cooperable with said first mentioned gear means to rotatably move same, spring means biasing said oscillatable gear in one rotational direction, power means, abutment means formed on the face of said oscillatable gear, an entrapment lever engageable with said abutment means and pivotally movable to effect rotatable movement of said oscillatable gear in one rotational direction, a pivoted drive link, resilient means interconnecting said pivoted drive link with said pivoted entrapment lever, means cooperable with said power means to effect intermittent pivotal movement of said drive link, and means forming an extension from said coil engageable with said entrapment lever and operable to limit pivotal movement thereof as a function of the rotated position of said pivoted coil.

5. In a photographic camera having a film exposing aperture and a diaphragm for controlling the amount of light reaching said aperture, the improvement of means for automatically adjusting the diaphragm in response to the light available about said camera comprising a photoelectric cell, a galvanometer electrically connected to said photoelectric cell having a pivoted coil movable in response to variations in the electrical output of said cell, at least one iris member operable to define a diaphragm opening, an oscillatable gear cooperable with said first mentioned gear means to rotatably move same, spring means biasing said oscillatable gear in one rotational direction, power means, abutment means formed on the face of said oscillatable gear, an entrapment lever engageable with said abutment means and pivotally movable to effect rotatable movement of said oscillatable gear in one rotational direction, a pivoted drive link, resilient means interconnecting said pivoted drive link with said pivoted entrapment lever, means cooperable with said power means to effect intermittent pivotal movement of said drive link, means forming an extension from said coil engageable with said entrapment lever and operable to limit pivotal movement thereof as a function of the rotated position of said pivoted coil, and means sensitive to be rotated position of said last mentioned means cooperable with said gear means and effective to intermittently prevent spring urged rotational movement of said oscillatable gear.

6. In a photographic camera having a film exposing aperture and a diaphragm for controlling the amount of light reaching said aperture, the improvement of means for automatically adjusting the diaphragm in response to the light available about said camera comprising a photoelectric cell, an electromechanical transducer electrically connected to said photoelectric cell having a pivoted member movable in response to variations in the electrical output of said cell, at least one iris member operable to define a diaphragm opening, gear means cooperable with said iris member to move said iris member to vary the area of said diaphragm opening, an oscillatable gear cooperable with said first mentioned gear means to rotatably move same, means biasing said oscillatable gear in one rotational direction, power means, abutment means formed on the face of said oscillatable gear radially outwardly of the center axis thereof, an entrapment lever pivotally mounted within said camera and engageable with said abutment means to effect rotational movement of said oscillatable gear in one direction upon pivotal movement thereof, a pivoted drive link, resilient means interconnecting said entrapment lever with said pivoted drive link, a rotatable cam wheel operably connected to said power means and rotatably moved thereby and engageable with said drive link for effecting pivotal movement thereof, and means forming an extension from said pivoted coil engageable with said entrapment lever to limit pivoted movement thereof.

7. In a photographic camera having a film exposing aperture and a diaphragm for controlling the amount of light reaching said aperture, the improvement of means for automatically adjusting the diaphragm in response to the light available about said camera comprising a photoelectric cell, an electro-mechanical transducer electrically connected to said photoelectric cell having a pivoted element movable in response to variations in the electrical output of said cell, at least one iris member operable to define a diaphragm opening, gear means cooperable with said iris member to move said iris member to vary the area of said diaphragm opening, oscillatable gear means cooperable with said first mentioned gear means to operably move same, means biasing said oscillatable gear means in one rotational direction, power means, resilient drive means drivingly interconnecting said power means with said oscillatable gear means to intermittently urge same in an opposite rotational direction, positioning means engageable with said pivoted element to limit rotational movement of said oscillatable gear means as a function of the intensity of light impinging on said photoelectric cell, and means engageable with said gear means for preventing movement thereof when said positioning means is disengaged from said pivoted element.

References Cited in the file of this patent
UNITED STATES PATENTS

| | | |
|---|---|---|
| 1,247,682 | Howell | Nov. 27, 1917 |
| 2,061,909 | Karg | Nov. 24, 1936 |
| 2,838,985 | Burger et al. | June 17, 1958 |